United States Patent
Jin et al.

(10) Patent No.: US 11,046,360 B2
(45) Date of Patent: Jun. 29, 2021

(54) APPARATUS AND METHOD FOR CONTROLLING ELECTRIC POWER STEERING MOTOR

(71) Applicant: MANDO CORPORATION, Gyeonggi-do (KR)

(72) Inventors: Jong Hak Jin, Gyeonggi-do (KR); Seung Gyu Hong, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 500 days.

(21) Appl. No.: 15/953,402

(22) Filed: Apr. 13, 2018

(65) Prior Publication Data
US 2018/0334184 A1 Nov. 22, 2018

(30) Foreign Application Priority Data
May 22, 2017 (KR) .......................... 10-2017-0063068

(51) Int. Cl.
*B62D 5/04* (2006.01)
*B62D 6/00* (2006.01)

(52) U.S. Cl.
CPC ......... *B62D 5/0463* (2013.01); *B62D 5/0469* (2013.01); *B62D 6/002* (2013.01); *B62D 5/0424* (2013.01); *B62D 5/0448* (2013.01)

(58) Field of Classification Search
CPC ......... B62D 6/002; B62D 9/005; B62D 9/007
See application file for complete search history.

(56) References Cited

U.S. PATENT DOCUMENTS

| 4,115,727 A * | 9/1978 | Gross ........................ H02P 3/24 318/762 |
| 2019/0270482 A1* | 9/2019 | Nakakuki ............ B62D 5/0409 |
| 2019/0344823 A1* | 11/2019 | Miyajima ................ B62D 5/04 |

FOREIGN PATENT DOCUMENTS

| CN | 103863385 A | * | 6/2014 |
| CN | 106428200 | | 2/2017 |
| DE | 10 2006 003 428 | | 7/2007 |
| JP | 2006248252 A | * | 9/2006 |
| JP | 4872378 | | 2/2012 |

(Continued)

OTHER PUBLICATIONS

Office Action dated Jul. 3, 2020 for Chinese Patent Application No. 201810486782.2 and its English translation by Google Translate.

(Continued)

*Primary Examiner* — Peter D Nolan
*Assistant Examiner* — Ce Li Li
(74) *Attorney, Agent, or Firm* — Ladas & Parry, LLP

(57) ABSTRACT

The present disclosure relates to an apparatus and a method for controlling an electric power steering motor, and the apparatus may include: a transceiver configured to receive information on a steering angle and information on an electric power steering motor and to transmit a control signal to the electric power steering motor; a motor operation determiner configured to recognize a rack stroke range and to determine whether a motor-limitation mode must be initiated or terminated based on the received information on the steering angle and electric power steering motor; and a motor control signal generator configured to generate a control signal corresponding to the determined initiation or termination of the motor-limitation mode.

13 Claims, 6 Drawing Sheets

(56) References Cited

FOREIGN PATENT DOCUMENTS

| | | |
|---|---|---|
| KR | 10-2012-0137032 | 12/2012 |
| KR | 10-2015-0055982 | 5/2015 |

OTHER PUBLICATIONS

Office Action dated Jul. 14, 2020 for German Patent Application No. 10 2018 112 207.1 and its English translation by Google Translate.
Office Action dated Mar. 29, 2021 for Korean Patent Application No. 10-2017-0063068 and its English translation from Global Dossier.
Office Action dated Feb. 26, 2021 for Chinese Patent Application No. 201810486782.2 and its English translation from Global Dossier.
Chen Hui: "Simulation and Design of Automotive Electronic Control Systems", Tongji University Press, Jan. 2017, pp. 177-178.

\* cited by examiner

APPARATUS AND METHOD FOR CONTROLLING ELECTRIC POWER STEERING MOTOR

CROSS REFERENCE TO RELATED APPLICATION

This application claims priority from Korean Patent Application No. 10-2017-0063068, filed on May 22, 2017, which is hereby incorporated by reference for all purposes as if fully set forth herein.

BACKGROUND OF THE INVENTION

1. Field of the Invention

The present disclosure relates to an apparatus and a method for controlling a rack-pinion gear-type electric power steering motor and, more particularly, to an apparatus and a method for controlling an electric power steering motor that limits a rack stroke.

2. Description of the Prior Art

A steering apparatus is an apparatus that allows a driver to freely change a traveling direction of a vehicle by turning a steering wheel and is an apparatus for assisting the driver to drive a vehicle in a desired direction by changing a turning center of a front wheel of the vehicle. The steering apparatus adopts a power steering system, such as an electric power steering (EPS) apparatus, for assisting the driver.

A rack-pinion-type electric power steering (EPS) apparatus is configured to detect a torque applied to a steering wheel by the driver, to output an electric signal proportional to the torque, to receive the electric signal by an electronic control unit (ECU), and to generate an auxiliary steering power proportional thereto, thereby moving a rack bar in the axial direction so as to perform a steering motion.

When an external force acts on the vehicle (for example, when a small amount of auxiliary steering power is applied due to a small amount of friction between the vehicle and a road surface in the case where a frictional force of the road surface is reduced due to foreign substances thereon, the vehicle is running, or the vehicle starts to move in the parking state so that a frictional force between the vehicle and the road surface is drastically reduced from a static frictional force to a kinetic frictional force), the driver tends to turn the steering wheel until the rack is hit.

However, in such a rack-pinion-type electric power steering (EPS) system, if the driver turns the steering wheel until it stops, a stopper of the rack bar collides with the end of a gearbox housing, and collision due to the inertia of the rack generates noise and vibration in the vehicle, thereby causing mechanical damage as well as discomfort to the driver.

Recently, a variable rack stroke system (VRS) has been adopted in a vehicle. The variable rack stroke system (VRS) reduces a rack stroke to change a maximum steering angle of a vehicle, thereby increasing or reducing the turning radius of the vehicle. The VRS limits the maximum steering angle of the steering wheel in the case of installing a tire chain, changing the size of a tire, or replacing a shock absorber. Especially, in the case of installing a tire chain, the VRS can prevent the tire chain from interfering with a vehicle body, and it is possible to reduce the minimum turning radius of the vehicle in the normal case in which no tire chain is installed.

As described above, there is a need to prevent the driver from turning the steering wheel at a maximum angle.

SUMMARY OF THE INVENTION

The present disclosure has been made in order to solve the above problem, and provides an apparatus and a method for controlling an electric power steering motor for limiting a rack stroke.

In addition, the present disclosure provides an apparatus and a method for preventing collision of a rack bar stopper and preventing mechanical damage and noise of a vehicle by limiting the rack stroke more easily.

Furthermore, the present disclosure provides an apparatus and a method for varying the limited rack stroke by detecting a steering angle of the vehicle and the operation of the electric power steering motor.

Technical problems to be solved by the present disclosure are not limited to the above-mentioned technical problems, and other unmentioned technical problems can be clearly understood by those skilled in the art from the following description.

In view of the above aspects, an apparatus for controlling an electric power steering motor, according to an embodiment of the present disclosure, may include: a transceiver configured to receive information on a steering angle and information on an electric power steering motor and to transmit a control signal to the electric power steering motor; a motor operation determiner configured to recognize a rack stroke range and to determine whether a motor-limitation mode must be initiated or terminated based on the received information on the steering angle and electric power steering motor; and a motor control signal generator configured to generate a control signal corresponding to the determined initiation or termination of the motor-limitation mode.

In view of the above aspects, a method for controlling an electric power steering motor, according to an embodiment of the present disclosure, may include: a transmission/reception step of receiving information on a steering angle and information on an electric power steering motor and transmitting a control signal to the electric power steering motor; a motor operation determination step of recognizing a rack stroke range and determining whether a motor-limitation mode must be initiated or terminated based on the received information on the steering angle and electric power steering motor; and a motor control signal generation step of generating a control signal corresponding to the determined initiation or termination of the motor-limitation mode.

Other details of the present disclosure are included in the detailed description and the drawings.

As described above, according to the present disclosure, it is possible to effectively limit the rack stroke, thereby reducing damage to the vehicle and providing convenience to the driver.

In addition, the present disclosure has an effect of stably controlling the motion of the vehicle when an external force is applied thereto while minimizing the heterogeneity due to a sudden change in the steering of the vehicle.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
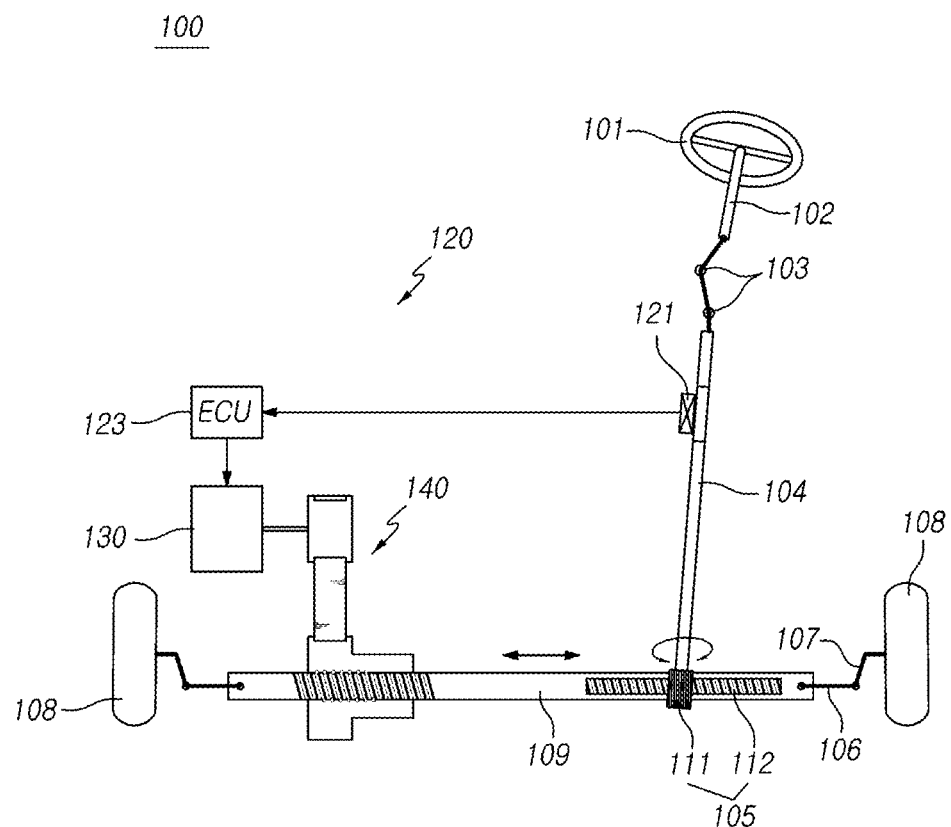
FIG. 1 is a perspective view showing a rack-type electric power steering apparatus.

Hereinafter, preferred embodiments of the present disclosure will be described in detail with reference to the accompanying drawings. The advantages and features of the present disclosure and methods of achieving the same will be apparent by referring to embodiments of the present disclosure as described below in detail in conjunction with the accompanying drawings. However, the present disclosure is not limited to the embodiments set forth below, but may be implemented in various different forms. The following embodiments are provided only to completely disclose the present disclosure and inform those skilled in the art of the scope of the present disclosure, and the present disclosure is defined only by the scope of the appended claims. Throughout the specification, the same or like reference numerals designate the same or like elements.

While the terms "first", "second", and the like may modify various elements, components, and/or sections, it will be apparent that such elements, components, and/or sections are not limited by the above terms. The above terms are used merely for the purpose of distinguishing an element, component, or section from other elements, components, or sections. Accordingly, it will be apparent that a first element, a first component, or a first section as mentioned below may be a second element, a second component, or a second section within the technical spirit of the present disclosure.

The terms as used herein are merely for the purpose of describing embodiments and are not intended to limit the present disclosure. As used herein, singular forms are intended to include plural forms unless the context clearly indicates otherwise. The terms "comprises" and/or "includes" as used herein refer to the existence of a disclosed component, step, operation, and/or element, and do not exclude the existence of or a possibility of addition of one or more other components, steps, operations, and/or elements.

Hereinafter, the present disclosure will be described in more detail with reference to the accompanying drawings.

FIG. 1 is a perspective view showing a rack-type electric power steering apparatus.

As shown in FIG. 1, a rack-type electric power steering apparatus of a vehicle is generally configured to include a steering apparatus 100 that ranges from a steering wheel 101 to wheels 108 at both sides and an auxiliary power mechanism 120 for providing an auxiliary steering power to the steering apparatus 100.

The steering apparatus 100 is configured to include a steering shaft 102 having one end connected to the steering wheel 101 so as to be rotated together with the steering wheel 101 and the opposite end connected to a pinion shaft 104 via a pair of universal joints 103. The pinion shaft 104 is connected to a rack bar 109 via a rack-pinion mechanism 105 and both ends of the rack bar 109 are connected to the wheels 108 of the vehicle through a tie rod 106 and a knuckle arm 107.

The rack-pinion mechanism 105 includes a pinion gear 111 formed on the pinion shaft 104 and a rack gear 112 formed on one side of the outer circumferential surface of the rack bar 109 so as to be engaged with the pinion gear 111. When the driver turns the steering wheel 101, a torque is generated in the steering apparatus 100, and the generated torque controls the direction of the wheels 108 through the rack-pinion mechanism 105 and the tie rod 106.

The auxiliary power mechanism 120 is configured to include a torque sensor 121 for sensing a torque applied to the steering wheel 101 by the driver to thus output an electric signal proportional to the sensed torque, an electronic control unit (ECU) 123 for generating a control signal based on an electric signal transmitted from the torque sensor 121, a motor 130 for generating an auxiliary steering power based on a control signal transmitted from the electronic control unit 123, and a belt-type power transmission device 140 for transferring an auxiliary steering power generated by the motor 130 to the rack bar 109 via a belt.

Thus, the rack-type electric power steering apparatus is configured such that a torque generated by the rotation of the steering wheel 101 is transferred to the rack bar 109 via the rack-pinion mechanism 105, and such that an auxiliary steering power generated in the motor 130 according to the generated torque is transferred to the rack bar 109 via a ball screw by means of the belt-type power transmission device 140. That is, the rack bar 109 may be moved in the axial direction by a combination of the torque generated in the steering apparatus 100 and the auxiliary steering power generated in the motor 130.

However, the rack bar 109 has a limited stroke range due to its mechanical characteristics. Thus, an additionally transferred torque at the stroke end may cause collision with other components, and especially, it may cause collision between a stopper of the rack bar and an end of the gearbox housing. This collision may bring about noise and vibration in the vehicle, thereby causing discomfort to the driver as well as mechanical damage.

Therefore, in order to effectively prevent collision of the rack stopper, in addition to the limitation of the auxiliary steering power, it is necessary to limit the amount of the auxiliary steering power by setting a stroke range of the rack and to predetermine the limit of the auxiliary steering power in a linear form depending on the position of the rack, thereby performing control such that an applied steering power does not exceed the limit.

In addition, in the case of installing tire chains on the wheels 108 or adopting wide tires, the maximum range of the rack stroke may be limited using a function of the variable rack stroke system (VRS) to limit the amount of the steering power such that the steering wheel 101 can be operated within a target steering angle smaller than a predetermined maximum steering angle, which may be provided by controlling the operation of the motor 130.

Although a rack-type EPS (R-EPS) has been shown and described as an electric power steering apparatus in FIG. 1, the present disclosure can be applied to a hydraulic EPS, a column-type EPS (C-EPS), a dual-pinion-type EPS (DP-EPS), or the like.

In addition, the present disclosure can also be applied to a reaction motor of a steer-by-wire (SBW)-type steering apparatus. That is, when a steering angle approaches a predetermined range of a rack stroke, the rotation of the reaction motor may be electrically or physically fixed so that the driver can feel the locking of the steering wheel.

Figure 2:
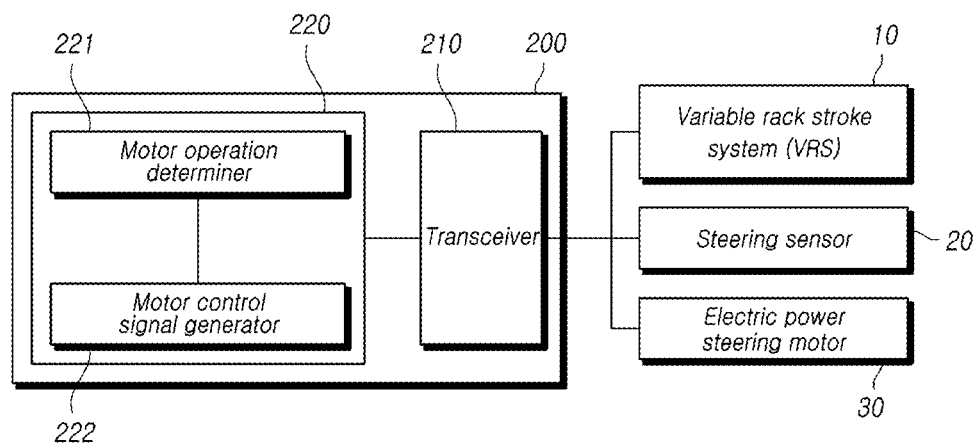
FIG. 2 is a block diagram of an apparatus for controlling an electric power steering motor according to an embodiment of the present disclosure.

FIG. 2 is a block diagram of an apparatus for controlling an electric power steering motor 30 according to an embodiment of the present disclosure.

Referring to FIG. 2, a control apparatus 200 of an electric power steering motor 30, according to the present disclosure, may include a transceiver 210 and a controller 220 having a motor operation determiner 221 and a motor control signal generator 222.

More specifically, the transceiver 210 may receive information on a steering angle and information on the electric power steering motor 30, which are transmitted from a steering sensor 20 to the control apparatus 200 of the electric power steering motor 30, and may transmit a control signal to the electric power steering motor 30.

When receiving the information on a steering angle, the transceiver 210 may receive at least one of a torque signal generated from a torque sensor and a steering angle signal generated from a steering angle sensor.

The steering sensor 20 may be a torque sensor for measuring a torque applied to the steering wheel by the driver or a steering angle sensor for measuring a steering angle of the steering wheel, but the steering sensor 20 is not limited thereto, and may be a sensor for measuring variables in relation to the movement of the rack. In addition, the steering sensor 20 may be a sensor that is provided in the housing of a gearbox enclosing the rack bar so as to sense the position of the rack.

Thus, the information on a steering angle, which is generated by the signal sensed by the steering sensor 20, is transmitted to the controller 220 through the transceiver 210, thereby determining the position of the rack.

When receiving the information on the electric power steering motor 30, the transceiver 210 may receive at least one of a motor torque signal generated from a motor torque sensor provided in the electric power steering motor 30 and a motor speed signal generated from a motor position sensor, and may transmit the same to the controller 220.

In addition, when a function of the variable rack stroke system (VRS) 10 is used in the case where tire chains are installed on the vehicle wheels or wide tires are adopted, the transceiver 210 may receive a changed rack stroke range from the variable rack stroke system (VRS) 10 to thus transmit the same to the controller 220.

The controller 220 may include a motor operation determiner 221 for determining a rack stroke range from the information received from the variable rack stroke system (VRS) 10 and determining whether a motor-limitation mode must be initiated or terminated based on the received information on the steering angle and the electric power steering motor 30 and a motor control signal generator 222 for generating a control signal corresponding to the determined initiation or termination of the motor-limitation mode.

The motor operation determiner 221 of the controller 220 may calculate the position of the rack based on the information on the steering angle, and may calculate the magnitude of a current applied to the electric power steering motor 30 and an angular velocity of the electric power steering motor 30 based on the information on the electric power steering motor 30.

The motor operation determiner 221 may also perform control so as to initiate a motor-limitation mode if a steering angle is within a threshold range of a target angle for the rack stroke range.

More specifically, the motor-limitation mode is intended to stop the rotation of the electric power steering motor, and may be an operation of turning off a three-phase switch of the electric power steering motor 30 or an operation of fixing an electronical angle of the electric power steering motor 30. The operation of the motor-limitation mode will be described later in more detail with reference to FIG. 5.

In addition, the motor operation determiner 221 of the controller 220 may determine the direction of a steering angle signal and the direction of a driver's torque signal, and may calculate an angular velocity of the electric power steering motor 30 using a motor speed signal.

The motor operation determiner 221 may perform control so as to terminate the motor-limitation mode if the direction of the steering angle signal matches the direction of the torque signal and if the direction of the calculated angular velocity does not match the direction of the motor torque signal in the motor-limitation mode.

For example, it may be assumed that the clockwise direction in the rotational motion is a positive direction and the counterclockwise direction is a negative direction. In the case where a steering angle signal has a positive direction (clockwise direction), if a torque signal has a positive direction and an angular velocity of the electric power steering motor 30 has a negative direction, it means that the steering angle of the vehicle is out of a threshold range of the target angle and returns back to a normal range in which no rack stroke is required to be limited. Therefore, the motor-limitation mode must be terminated.

In addition, in the case where a steering angle signal has a negative direction (counterclockwise direction), if a torque signal has a negative direction and an angular velocity of the electric power steering motor 30 has a positive direction, it means that the steering angle of the vehicle is out of the threshold range of the target angle and returns back to the normal range. Therefore, the motor-limitation mode must be terminated.

That is, when the driver maintains the steering angle at a constant torque in the state in which the steering angle has reached the threshold range, in which the rack stroke is required to be limited, through the operation of the steering wheel by the driver, the motor-limitation mode is initiated so that an auxiliary steering power of the electric power steering motor is not applied. However, the rack may move to the normal range in which no rack stroke is required to be limited by an alignment force of the tires or an elastic force of the tires. Therefore, in this case, since the motor-limitation mode is required to be released, the motor operation determiner 221 may determine the same and may terminate the motor-limitation mode as described above.

As described above, the motor operation determiner 221 may automatically initiate or terminate the motor-limitation mode using information obtained by detecting the steering angle of the vehicle, the torque signal of the driver, and the operation of the electric power steering motor 30.

The motor control signal generator 222 may generate a control signal for initiating or terminating the motor-limitation mode, and may transmit the same to the variable rack stroke system 10 and the electric power steering motor 30 through the transceiver 210, thereby facilitating the limitation of the rack stroke.

In addition, the above-described control apparatus 200 of the electric power steering motor 30 may implement control logic of the electric power steering motor 30 by adopting software without installing hardware.

Figure 3:
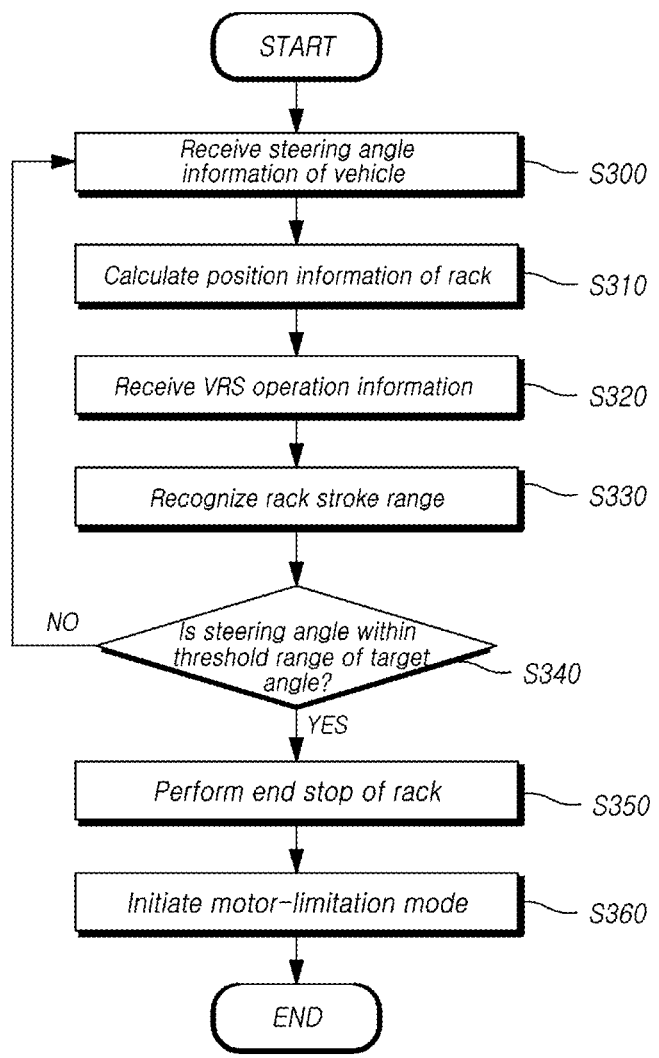
FIG. 3 is a flowchart illustrating a method of controlling an electric power steering motor for initiating a motor-limitation mode according to an embodiment of the present disclosure.

FIG. 3 is a flowchart illustrating a method of controlling an electric power steering motor for initiating a motor-limitation mode according to an embodiment of the present disclosure.

Referring to FIG. 3, a method of controlling an electric power steering motor, according to the present disclosure, may include: a transmission/reception step of receiving information on a steering angle and information on an electric power steering motor and transmitting a control signal to the electric power steering motor; a motor operation determination step of recognizing a rack stroke range and determining whether a motor-limitation mode must be initiated or terminated based on the received information on the steering angle and electric power steering motor; and a motor control signal generation step of generating a control signal corresponding to the determined initiation or termination of the motor-limitation mode.

Information on a steering angle is received in the transmission/reception step (S300), wherein at least one of a torque signal generated from a torque sensor and a steering angle signal generated from a steering angle sensor may be received.

Next, in the motor operation determination step, the position of a rack is calculated based on the information on the steering angle (S310). Then, the transceiver 210 receives a signal indicating whether or not a variable rack stroke system (VRS) is operated, which is used in the case of installing tire chains on the vehicle wheels or adopting wide tires, and a rack stroke range changed by the variable rack stroke system (VRS) is recognized (S330). When the rack stroke range is determined, a threshold range of a target angle for the steering angle to limit the auxiliary steering power is determined.

When recognizing the rack stroke range, if the rack stroke range is fixed according to the mechanical design, a predetermined value may be stored and may then be reflected. If the rack stroke range varies in real time, the variable stroke range may be updated in real time.

Then, in the motor operation determination step, it is determined whether or not the steering angle is within the threshold range of the target angle for the rack stroke range (S340), and if the steering angle is within the threshold range, control is performed such that an end stop function of the rack for limiting the rack stroke range is executed (S350) and the motor-limitation mode is initiated (S360).

In the motor control signal generation step, a control signal for initiating the motor-limitation mode is generated and transmitted to the variable rack stroke system (VRS) and the electric power steering motor through the transceiver 210, thereby facilitating the limitation of the rack stroke.

Figure 4:
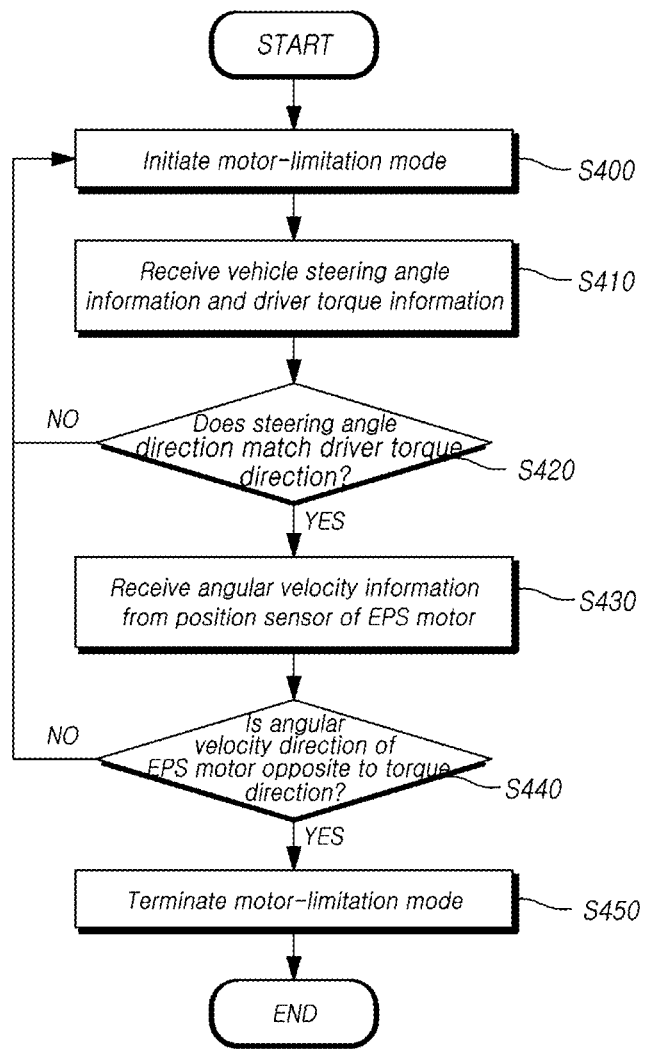
FIG. 4 is a flowchart illustrating a method of controlling an electric power steering motor for terminating a motor-limitation mode according to an embodiment of the present disclosure.

FIG. 4 is a flowchart illustrating a method of controlling an electric power steering motor for terminating a motor-limitation mode according to an embodiment of the present disclosure.

According to the control method of the electric power steering motor described above, when a small amount of auxiliary steering power is applied in the case where a frictional force of the road surface is small or in the case where a frictional coefficient between the vehicle and the road surface is drastically reduced when the vehicle starts to move in the parking state, it is possible to effectively prevent collision of the rack stopper by providing interference with the steering wheel operation of the vehicle driver.

Referring to FIG. 4, a motor-limitation mode is initiated for the electric power steering motor (S400), and information on a steering angle and information on an electric power steering motor are received in a transmission/reception step (S410), wherein at least one of a motor torque signal generated from a motor torque sensor and a motor speed signal generated from a motor position sensor, which are provided in the electric power steering motor, may be received.

Then, in the motor operation determination step, it is determined whether or not the direction of a steering angle signal of the vehicle matches the direction of a driver torque signal (S420).

If the direction of the torque signal matches the direction of the steering angle signal, an angular velocity of the electric power steering motor is calculated from the motor speed signal (S430).

Then, it is determined whether or not the direction of the calculated angular velocity is opposite to the direction of the torque signal or the direction of the steering angle signal (that is, the direction of the calculated angular velocity does not match the direction of the torque signal or the direction of the steering angle signal) (S440), and if the direction of the calculated angular velocity is opposite to the direction of the torque signal or the direction of the steering angle signal, control is performed so as to terminate the motor-limitation mode (S450).

For example, it may be assumed that the clockwise direction in the rotational motion is a positive direction and the counterclockwise direction is a negative direction. In the case where a steering angle signal has a positive direction (clockwise direction), if a torque signal has a positive direction and an angular velocity of the electric power steering motor has a negative direction, it means that the steering angle of the vehicle is out of the threshold range of the target angle and is within a normal range in which no rack stroke is required to be limited. Therefore, the motor-limitation mode must be terminated.

Similarly, in the case where a steering angle signal has a negative direction (counterclockwise direction), if a torque signal has a negative direction and an angular velocity of the electric power steering motor has a positive direction, it means that the steering angle of the vehicle is out of the threshold range of the target angle and returns back to the normal range. Therefore, the motor-limitation mode must be terminated.

In the motor control signal generation step, a control signal for terminating the motor-limitation mode is generated and transmitted to the variable rack stroke system (VRS) and the electric power steering motor through the transceiver 210, thereby facilitating the limitation of the rack stroke.

According to the control method of the electric power steering motor described above, a direction may be calculated using information obtained by detecting the steering angle of the vehicle and the operation of the electric power steering motor, and the operation of the electric power steering motor fixed due to the limitation of the rack stroke may be re-executed, thereby automatically initiating or terminating the motor-limitation mode.

Figure 5A:
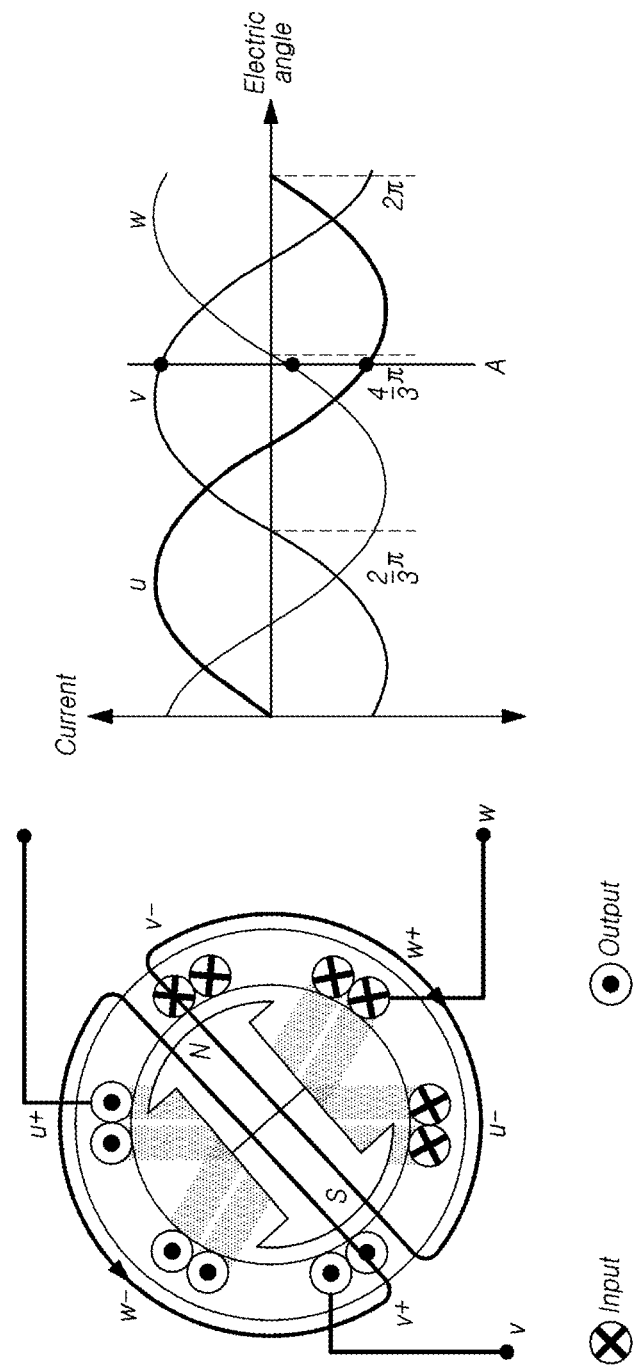
FIGS. 5A and 5B are diagrams illustrating a method for initiating a motor-limitation mode according to an embodiment of the present disclosure.
Figure 5B:
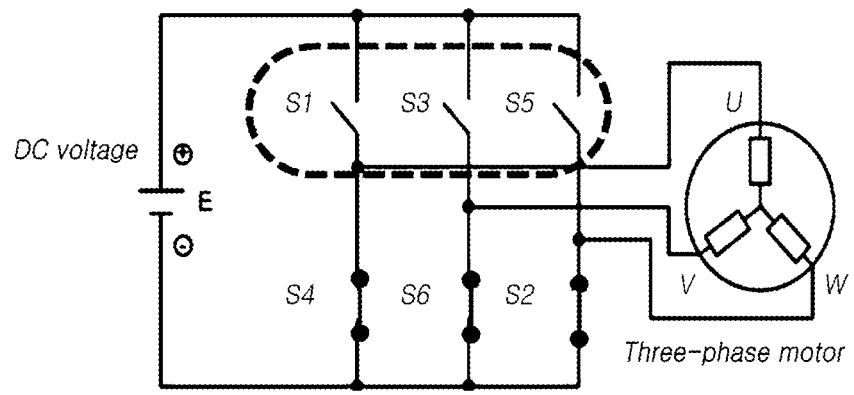

FIGS. 5A and 5B are diagrams illustrating a method for initiating a motor-limitation mode according to an embodiment of the present disclosure.

The motor-limitation mode refers to a mode in which the rotation of the motor is stopped.

For example, the motor-limitation mode may refer to a mode to perform an operation of turning off three-phase switches of a three-phase electric power steering motor.

As another example, the motor-limitation mode may refer to a mode to perform an operation of fixing an electric angle of the electric power steering motor.

Here, the electric power steering motor is assumed as a motor using alternating current.

More specifically, when a current is applied to a three-phase electric power steering motor, it is operated by means of three waveforms (i.e., waveforms 'u', 'v', and 'w') having a phase difference of 120 ($2\pi/3$) degrees according to an electric angle of the rotor, and when a calculated current is applied to the electric power steering motor at a positional angle of the rotor, the rotor of the electric power steering motor is rotated according to the amount and direction of the positional angle. That is, when a current corresponding to the electric angle according to the calculated auxiliary steering power is applied to the electric power steering motor, the rotor is rotated by the electric angle, thereby driving the electric power steering motor.

FIG. 5A shows cross-section of a rotor of a three-phase and two-pole electric power steering motor and a current-electric angle graph thereof in order to explain the operation of fixing an electric angle of the electric power steering motor.

As shown in FIG. 5A, ±u, ±v, and ±w indicate ends and starts of windings of a three-phase and two-pole electric power steering motor. Since the polarity of the magnetic field changes as the direction of current changes, 'u', 'v', and 'w' change, thereby rotating the motor.

As described above, the position of the electric power steering motor can be detected at every 120 degrees, and changes in the waveforms 'u', 'v', and 'w' are determined by the electric angle of the electric power steering motor. Thus, if the electric angle is fixed, a value of the current applied to the electric power steering motor is fixed as well, thereby fixing the rotor. Therefore, when the electric angle of the electric power steering motor is fixed, the electric power steering motor may be stopped.

More specifically, the motor-limitation mode through the fixing of an electric angle denotes a mode in which the motor is stopped by performing an operation of converting alternating currents applied to the respective three-phase terminals of the electric power steering motor into direct currents.

In this case, a direct current value may be determined based on the time at which the initiation of the motor-limitation mode is determined and a torque signal of the driver. For example, the direct current value may be determined as a value obtained by applying a weight factor that is set in proportion to the driver torque signal based on values of alternating currents applied to the respective three-phase terminals at the time at which the initiation of the motor-limitation mode is determined.

Referring to FIG. 5A, in the case where the electric angle of the alternating currents applied to the three-phase terminals corresponds to the position 'A' at the time at which the initiation of the motor-limitation mode is determined, in order to fix the electric angle of the electric power steering motor at the angle of the position 'A', current values corresponding to the electric angle of the position 'A' (i.e., the current values corresponding to three points on the waveforms of the current-electric angle graph) are set as direct current values, and the direct currents are applied to the electric power steering motor without changing the phases thereof, thereby fixing the rotor of the electric power steering motor and stopping the operation thereof.

Alternatively, in the case where the electric angle of the alternating currents applied to the three-phase terminals corresponds to the position 'A' at the time at which the initiation of the motor-limitation mode is determined, direct currents may be determined by multiplying values of the currents applied to the respective three-phase terminals at the position 'A' by a weight factor determined in proportion to the steering torque of the driver, and may then be applied to the respective three-phase terminals. According thereto, since current values applied to the three-phase terminals of the motor are increased as the driver steering torque increases, it is possible to fix the rotor by a stronger force. On the other hand, if the driver steering torque is reduced, current values applied to the three-phase terminals of the motor are reduced in proportion thereto, so that the rotor may be fixed even by a weaker force. This may provide an effect of suppressing unnecessary heat generated from the motor, and may fix the rotation of the motor using only the current dynamically required according to the driver steering torque, thereby providing advantages in terms of heat generation and energy waste.

The predetermined weight factor may be pre-stored as a value corresponding to a driver torque value or the range thereof through an experiment or the like.

Meanwhile, when the vehicle driver turns the steering wheel in the direction in which collision of the stopper of the rack occurs while gradually increasing a force in the state in which the electric angle is fixed by preliminarily setting current values corresponding to the position 'A' as direct current values (that is, when the driver torque is increased by turning the steering wheel with a strong force within a range of the steering angle in which the rack stroke is limited), a torque value of the steering torque sensor may be calculated, and a value of the current applied to the electric power steering motor may be increased in proportion thereto, thereby maintaining the motor-limitation mode.

On the other hand, when the vehicle driver turns the steering wheel in the direction in which collision of the stopper of the rack occurs while gradually reducing a force, a value of the current applied to the electric power steering motor may be reduced, thereby maintaining the motor-limitation mode.

This can reduce the heat generation of the electric power steering motor and the heterogeneity for a change in the auxiliary steering power due to the motor-limitation mode when the vehicle driver turns the steering wheel while effectively reducing the amount of the auxiliary steering power of the vehicle driver.

FIG. 5B is a circuit diagram of an electric power steering motor for explaining an operation of turning off three-phase switches of the electric power steering motor.

More specifically, switches S1 to S6 of a three-phase electric power steering motor circuit are turned on and off to selectively apply alternating current to three-phase terminals 'u', 'v', and 'w'. If the order of on/off operations of the switches is changed, the order of u-v, v-w, and w-u is also changed, thereby changing the rotational direction of the electric power steering motor. Preferably, an insulated gate bipolar transistor (IGBT) semiconductor device may be used as a switching device, but the present disclosure is not limited thereto.

As shown in FIG. 5B, the electric power steering motor may be maintained to be stopped regardless of an external force by turning off (opening) the switches for the three-phase terminals 'u', 'v', and 'w' of the electric power steering motor.

Therefore, it is possible to initiate the motor-limitation mode, in which the operation of the electric power steering motor is stopped, by the above-described method.

As described above, according to an apparatus and a method for controlling an electric power steering motor, according to the present disclosure, it is possible to reduce damage to the vehicle, provide convenience to the driver, minimize heterogeneity due to an abrupt change in the steering of the vehicle, and stably control the motion of the vehicle in a situation, in which an external force is applied to the vehicle, by effectively limiting the rack stroke.

Even if it was described above that all of the components of an embodiment of the present disclosure are coupled as a single unit or coupled to be operated as a single unit, the present disclosure is not necessarily limited to such an embodiment. That is, at least two elements of all structural elements may be selectively joined and operate without departing from the scope of the present disclosure.

The above embodiments of the present disclosure have been described only for illustrative purposes, and those skilled in the art will appreciate that various modifications and changes may be made thereto without departing from the scope and spirit of the disclosure. The scope of the present disclosure shall be construed on the basis of the accompanying claims in such a manner that all of the technical ideas included within the scope equivalent to the claims belong to the present disclosure.

What is claimed is:

1. An apparatus for controlling an electric power steering motor, the apparatus comprising:
    a transceiver configured to receive information on a steering angle and information on an electric power steering motor and to transmit a control signal to the electric power steering motor;
    a motor operation determiner configured to recognize a rack stroke range and to determine whether a motor-limitation mode is initiated or terminated based on the received information on the steering angle and electric power steering motor, determine a direction of a steering angle signal and a direction of a torque signal, and calculate an angular velocity of the electric power steering motor, wherein the motor operation determiner is configured to terminate the motor-limitation mode when the direction of the steering angle signal matches the direction of the torque signal and when a direction of the angular velocity of the electric power steering motor does not match the direction of the steering angle signal in the motor-limitation mode; and
    a motor control signal generator configured to generate a control signal corresponding to the determined initiation or termination of the motor-limitation mode,
    wherein the torque signal is generated from a torque sensor, the steering angle signal is generated from a steering angle sensor when receiving the information on the steering angle, and a motor speed signal is generated from a motor position sensor when receiving the information on the electric power steering motor.

2. The apparatus of claim 1, wherein the motor operation determiner is configured to calculate a position of the rack based on the information on the steering angle, and is configured to calculate the magnitude of a current applied to the electric power steering motor and the angular velocity of the electric power steering motor based on the information on the electric power steering motor.

3. The apparatus of claim 1, wherein the motor operation determiner is configured to perform control so as to initiate the motor-limitation mode when the steering angle is within a threshold range of a target angle for the rack stroke range.

4. The apparatus of claim 1, wherein the motor-limitation mode is a mode for stopping the rotation of the electric power steering motor and is a mode for performing an operation of turning off three-phase switches of the electric power steering motor.

5. The apparatus of claim 1, wherein the motor operation determiner is configured to calculate the angular velocity of the electric power steering motor using the motor speed signal.

6. The apparatus of claim 1, wherein the motor-limitation mode is a mode for stopping the rotation of the electric power steering motor and is a mode for converting alternating currents applied to respective three-phase terminals of the electric power steering motor into direct current values.

7. The apparatus of claim 6, wherein the direct current values are determined based on the time at which the initiation of the motor-limitation mode is determined and the torque signal of a driver.

8. The apparatus of claim 7, wherein the direct current values are determined by applying a weight factor that is set in proportion to the torque signal based on values of alternating currents applied to the respective three-phase terminals of the electric power steering motor at the time at which the initiation of the motor-limitation mode is determined.

9. A method for controlling an electric power steering motor, the method comprising:
    receiving information on a steering angle and information on an electric power steering motor and transmitting a control signal to the electric power steering motor;
    determining a direction of a steering angle signal and a direction of a torque signal;
    calculating an angular velocity of the electric power steering motor;
    recognizing a rack stroke range and determining whether a motor-limitation mode is initiated or terminated based on the received information on the steering angle and electric power steering motor, wherein the determining of whether the motor-limitation mode is initiated or terminated comprises determining to terminate the motor-limitation mode when the direction of the steering angle signal matches the direction of the torque signal and when a direction of the angular velocity of the electric power steering motor does not match the direction of the steering angle signal in the motor-limitation mode; and
    generating a control signal corresponding to the determined initiation or termination of the motor-limitation mode,
    wherein the torque signal is generated from a torque sensor, the steering angle signal is generated from a steering angle sensor when receiving the information on the steering angle, and a motor speed signal is generated from a motor position sensor when receiving the information on the electric power steering motor.

10. The method of claim 9, wherein
    the calculating of the angular velocity of the electric power steering motor calculates the angular velocity of the electric power steering motor using the motor speed signal.

11. The method of claim 9, wherein the motor-limitation mode is a mode for stopping the rotation of the electric power steering motor and is a mode for performing an operation of turning off three-phase switches of the electric power steering motor or an operation of converting alternating currents applied to respective three-phase terminals of the electric power steering motor into direct current values.

12. The method of claim 11, wherein the direct current values are determined based on the time at which the initiation of the motor-limitation mode is determined and the torque signal of a driver.

13. The method of claim 12, wherein the direct current values are determined by applying a weight factor that is set in proportion to the torque signal based on values of alternating currents applied to the respective three-phase terminals of the electric power steering motor at the time at which the initiation of the motor-limitation mode is determined.

* * * * *